July 21, 1953     A. I. EYSTER     2,645,856
TAPE MEASURE
Filed Dec. 26, 1946
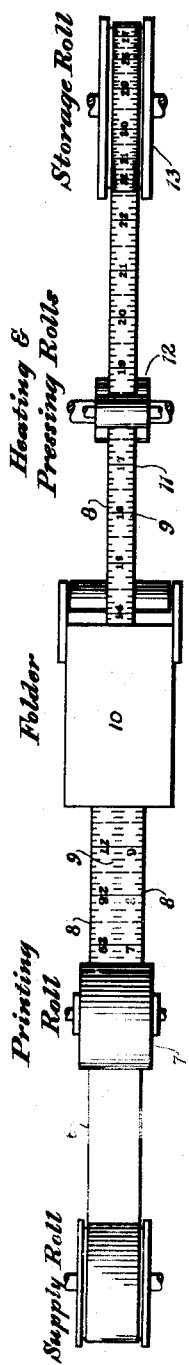
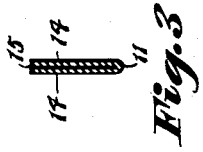
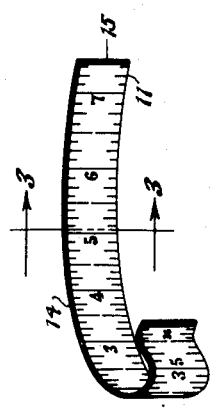
Inventor
Aden I. Eyster
By Emery, Holcombe & Elsin
Attorney Patented July 21, 1953

2,645,856

UNITED STATES PATENT OFFICE 2,645,856

TAPE MEASURE

Aden I. Eyster, Seven Valleys, Pa.

Application December 26, 1946, Serial No. 718,373

1 Claim. (Cl. 33—137)

This invention relates to measuring tapes and to a tape material suitable for use in such tapes. The invention is particularly directed to tape measures of extremely low cost such as are distributed for advertising purposes, or are sold at very low prices in popular stores.

Such low cost tape measures are well-known articles of manufacture, but heretofore have been unsatisfactory due to their inaccuracy and to their unsubstantial and short-lived characteristics. One type of such tape has been made of a single thickness of cloth tape, heavily loaded to give it body and provide a suitable surface for the marks printed on it. Such tapes lose their loading readily, through crumbling, thereby becoming flimsy and difficult to use as well as losing their markings. Another type of tape comprises a doubled strip of loaded tape, stitched together along its unfolded side. This type of tape is subject to losing its loading, and the two plies into which it is folded, being secured only along one edge, are free to move relatively to each other, creating a generally unsubstantial and inconvenient article. Both forms of tape are so notoriously inaccurate that they have been declared illegal for commercial measuring purposes.

It is the object of the present invention to provide an extremely low cost tape measure, and a tape for such measures, which has superior and novel qualities of substantial body, accurate and permanent dimensions, and capacity for permanently maintained and exactly positioned markings.

These objects are accomplished by making the tape of a well-known commercially available material known generically as "patching tape," which comprises a fabric tape, generally of closely woven cotton, coated on one side with thermoplastic material of such qualities that cause it to adhere to another fabric when applied under pressure and heat as exerted by a hand iron. The thermoplastic material may, for purposes of the present invention, be of any nature that renders it suitable for patching purposes, that is to say gutta percha, rubber compositions, or synthetic resins and plastics having qualities of substantially permanent bonding with the tape that carries them, and ability to become adhesive under conditions of heat and/or pressure.

In making the tape of this invention, the commercial patching tape is doubled into two plies with the coated surface inside, forming a fabric of two plies each having a coating of thermoplastic material, and this doubled tape is subjected to such heat and pressure as are necessary to bond the two plies together. The fabric thus thus formed, comprising the two plies adhesively bonded together by cohesion of their respective layers of thermoplastic material, is substantial, resistant to deformation by stretching yet flexible, and the permanent loading of the fabric by the thermoplastic material provides an excellent base for permanently retaining printed markings and characters. These qualities, desirable in tape measure material, appear to arise from the layer of thermoplastic material between the plies, which not only bonds the plies together, but which at least partly impregnates the cloth of the tape, locking the fibers and threads against relative movement. The material also presents an ideal printing surface, both before and after the doubling and bonding, so that printing may be accomplished at a point most convenient in manufacturing. Since the two plies are permanently bonded against relative movement, markings on the opposite surfaces may be accurately related to another, and will remain in such accurate relative positions.

In the preferred form of tape for tape-measuring purposes, the tape with its coating of thermoplastic material is folded longitudinally with the coating inside, forming a doubled or two ply strip with one edge formed by the longitudinal fold and the other by the registering edges of the original patching tape.

A convenient method of manufacture of tape measures of the preferred form is as follows. The tape patching material in commercial spooled form is unwound and in its original flat condition run past a printing roll by means of which the measuring marks are applied to its uncoated surface. These marks may be applied adjacent the edges of the unfolded tape or adjacent and on opposite sides of its center line, or in both areas. From the printing roll the tape is fed to a folding device, of any suitable kind, which folds the tape longitudinally with its coated side inward, and its edges in registration, thus forming it into two plies with their coated surfaces in face-to-face contact. The tape is then subjected to heat and pressure, as by heated rolls, the thermoplastic coatings on the two plies thereby being cohesively united to bond the tape in its folded form. Thereafter, the tape is cut into lengths in accordance with its markings, and any finishing or mounting is performed. By this method, any desirable length of tape may be formed.

In the accompanying drawings:

Fig. 1 is a diagrammatic plan indicating method and apparatus suitable for making the tape.

Fig. 2 is a perspective view of a section of the tape.

Fig. 3 is a transverse sectional view on line 3—3 of Fig. 1.

Referring to Fig. 1, a roll of commercial tape 6 having a thermoplastic material coating on its under face is fed to suitable printing apparatus 7 by which markings are applied in correct arrangement for the intended use of the tape, here shown as standard measuring markings in inches. These markings are applied to the uncoated surface of the tape, and are arranged in three series, one along each edge 8 of the tape with the figures in reversed order, while a series 9 in the center of the tape is applied without figures.

From the printing mechanism the tape is fed to a folder 10 by means of which the tape is formed into two plies with the edges 8 in registration, the thermoplastic coatings of these plies being inside and in face to face contact, while the markings are outside with the center series 9 being adjacent the folded edge 11 of the tape.

The tape is fed from the folder 10 to heating and pressing rolls 12, operating at such temperature and exerting such pressure as to soften the thermoplastic material, rendering it adhesive, and bonding the coatings of the respective plies together firmly and permanently. The tape is then wound on a storage roll 13, and subsequently is cut into lengths and finished, as by applying end bindings or other attachments.

The tape, as shown in Figs. 2 and 3, comprises two plies 14, firmly and permanently united by an intermediate layer 15 of thermoplastic material comprising the bonded together coatings of the respective plies into which the tape has been folded, one edge 11 of the tape being formed by the fold between the two plies and the other edge being formed by the registering edges of the starting tape.

While the longitudinally folded tape is preferred, substantially similar and entirely satisfactory tapes may be made by folding lengths of tape in other ways, as by folding a length upon itself along a transverse axis, or by placing two unconnected strips of patching tape in registration with their coated surfaces in face to face contact, and bonding them.

Tapes of the material disclosed above have desirable qualities of permanently maintained dimensions, accurately located marks, substantial body without undue stiffness, and are extremely inexpensive to make, both in material and production costs.

I claim:

A tape measure comprising a strip of flexible material coated across its entire width with adhesive material and longitudinally folded upon its median line into two plies in face-to-face contact with their edges in register, said coating of adhesive material forming a continuous layer between the plies adhesively united to each of them and binding them together, the thickness and stiffness of said coated material being small enough to permit folding thereof crosswise into comparatively short lengths adapted to contact flatwise throughout, and measuring marks on the outer surfaces of said plies adjacent the edges of the strip, those upon one surface being in permanent predetermined arrangement relative to those upon the other surface.

ADEN I. EYSTER.

References Cited in the file of this patent

UNITED STATES PATENTS

| Number | Name | Date |
| --- | --- | --- |
| 448,805 | Adler | Mar. 24, 1891 |
| 902,306 | Leahy | Oct. 27, 1908 |
| 940,873 | Hanrath | Nov. 23, 1909 |
| 1,207,906 | Hanrath | Dec. 12, 1916 |
| 1,561,229 | Haon | Nov. 10, 1925 |
| 2,051,626 | Wells, Jr. | Aug. 18, 1936 |
| 2,153,351 | Steinberger | Apr. 4, 1939 |
| 2,187,087 | Leary | Jan. 16, 1940 |